(12) United States Patent
Yoo et al.

(10) Patent No.: US 11,750,365 B2
(45) Date of Patent: Sep. 5, 2023

(54) METHOD AND DEVICE FOR COMPARING MOVEMENT PATHS BASED ON HOMOMORPHIC ENCRYPTION

(71) Applicant: Samsung Electronics Co., Ltd., Suwon-si (KR)

(72) Inventors: Dong-Hoon Yoo, Suwon-si (KR); Sunmin Kwon, Seoul (KR); Jieun Eom, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 138 days.

(21) Appl. No.: 17/341,824

(22) Filed: Jun. 8, 2021

(65) Prior Publication Data
US 2021/0409189 A1    Dec. 30, 2021

(30) Foreign Application Priority Data

Jun. 30, 2020   (KR) .................. 10-2020-0080454
Mar. 19, 2021   (KR) .................. 10-2021-0036046

(51) Int. Cl.
*H04L 9/00* (2022.01)
*G06F 21/62* (2013.01)

(52) U.S. Cl.
CPC .......... *H04L 9/008* (2013.01); *G06F 21/6218* (2013.01); *G06F 21/6245* (2013.01)

(58) Field of Classification Search
CPC .. G06F 21/62; G06F 21/6218; G06F 21/6245; H04L 9/008
See application file for complete search history.

(56) References Cited

U.S. PATENT DOCUMENTS

| | | |
|---|---|---|
| 9,202,079 B2 | 12/2015 | Kaliski, Jr. |
| 2018/0052970 A1* | 2/2018 | Boss ................. G06F 21/35 |
| 2020/0082113 A1* | 3/2020 | Van Liesdonk ...... G06Q 10/087 |
| 2021/0119792 A1* | 4/2021 | Bastable ............ H04N 21/4113 |
| 2021/0243595 A1* | 8/2021 | Buck ..................... H04W 12/63 |
| 2021/0248176 A1* | 8/2021 | Pankanti ............... H04L 9/0866 |
| 2021/0399873 A1* | 12/2021 | Duchin .................. H04L 9/006 |

FOREIGN PATENT DOCUMENTS

| | | |
|---|---|---|
| KR | 10-2017-0022455 A | 3/2017 |
| KR | 10-2017-0110236 A | 10/2017 |

OTHER PUBLICATIONS

Cho, Jihun et al., "Effective Privacy Technology for the Post COVID-19 Era", *SAMSUN SDS*, Apr. 3, 2020 (2 pages in English and 5 pages in Korean).
"What promising technologies are preparing for the post-COVID-19 era?", Korea Policy Briefing, Apr. 29, 2020 (2 pages in English and 13 pages in Korean).

* cited by examiner

*Primary Examiner* — D'Arcy Winston Straub
(74) *Attorney, Agent, or Firm* — NSIP Law (57) ABSTRACT

A method and device for comparing movement paths based on homomorphic encrypted is disclosed, where a server includes a processor configured to collect first encrypted movement path information of a comparison target encrypted by a common key, receive, from a user device, second encrypted movement path information of a user of the user device encrypted by a private key, compare the first encrypted movement path information and the second encrypted movement path information, decrypt a portion of a result of the comparison by the common key to generate a partially decrypted comparison result, and provide the partially decrypted result of the comparison to the user.

20 Claims, 6 Drawing Sheets

METHOD AND DEVICE FOR COMPARING MOVEMENT PATHS BASED ON HOMOMORPHIC ENCRYPTION

CROSS-REFERENCE TO RELATED APPLICATIONS

This application claims the benefit under 35 USC § 119(a) of Korean Patent Application No. 10-2020-0080454 filed on Jun. 30, 2020, and Korean Patent Application No. 10-2021-0036046 filed on Mar. 19, 2021, in the Korean Intellectual Property Office, the entire disclosures of which are incorporated herein by reference for all purposes.

BACKGROUND

1. Field

The following description relates to a method and device for comparing movement paths based on homomorphic encryption.

2. Description of Related Art

A centralized model and a decentralized model may be used for an epidemiological investigation to identify a contact of a confirmed person. The centralized model may enable easy identification of a movement path, but may have a high risk of invading privacy. The decentralized model may prevent such a privacy invasion issue by verifying only whether there is a contact or not with a confirmed person, without disclosing the movement path information of an individual. However, the decentralized model may not easily identify a movement path of a confirmed person.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a server, including a processor configured to collect first encrypted movement path information of a comparison target encrypted by a common key, receive, from a user device, second encrypted movement path information of a user of the user device encrypted by a private key, compare the first encrypted movement path information and the second encrypted movement path information, decrypt a portion of a result of the comparison by the common key to generate a partially decrypted comparison result, and provide the partially decrypted result of the comparison to the user.

The first encrypted movement path information and the second encrypted movement path information may include encrypted information associated with locations visited and time of the comparison target and the user, respectively.

The first encrypted movement path information and the second encrypted movement path information may include homomorphically encrypted information.

The processor may be configured to verify whether movement path information included in the second encrypted movement path information matches any movement path information included in the first encrypted movement path information.

The processor may be configured to decrypt the partially decrypted comparison result by the private key to verify whether a presence of a contact of the user with the comparison target.

The partially decrypted comparison result may be decrypted by an external device configured to manage the common key.

The private key may only accessible to the user.

The server may be deployed in a cloud and is configured to communicate with the user device and the external device.

In another general aspect, there is provided an electronic device, including a processor configured to receive, from a server, first encrypted movement path information of a comparison target encrypted by a common key, compare the first encrypted movement path information and a second encrypted movement path information of a user encrypted by a private key, transmit a result of the comparison to the server, and receive, from the server, a partially decrypted comparison result comprising a portion of the comparison result decrypted by the common key.

The first encrypted movement path information and the second encrypted movement path information may include encrypted information associated with locations visited and time of the comparison target and the user, respectively.

The first encrypted movement path information and the second encrypted movement path information may include homomorphically encrypted information.

The processor may be configured to verify whether movement path information included in the second encrypted movement path information matches any set of movement path information included in the first encrypted movement path information.

The processor may be configured to decrypt the partially decrypted comparison result by the private key and verify whether there is a contact of the user with the comparison target.

The partially decrypted comparison result may be decrypted by an external device configured to manage the common key.

The processor may be configured to obtain validation from the user a result of verifying whether the user contacted the comparison target.

In another general aspect, there is provided a server, including a processor configured to receive encrypted movement path information of individuals collected by one or more authorities and encrypted by a private key corresponding to each of the one or more authorities, generate a first encrypted contact list based on the encrypted movement path information, transmit, to the one or more authorities, a second encrypted contact list in which the first encrypted contact list is encrypted by a common key, receive a partially decrypted contact list in which the second encrypted contact list is decrypted by the private key of the one or more authorities, and obtain a final contact list by decrypting the partially decrypted contact list by the common key.

The encrypted movement path information may include homomorphically encrypted information.

The encrypted movement path information may include encrypted information associated with locations and time of individuals who visit the one or more authorities.

The first encrypted contact list may be generated by searching for contacts having a matching movement path with that of a comparison target based on the encrypted movement path information.

The partially decrypted contact list may be decrypted by an external device configured to manage the common key.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s). For example, a "first" component may be referred to as a "second" component, or similarly, and the "second" component may be referred to as the "first" component within the scope of the right according to the concept of the present disclosure.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

Figure 1:
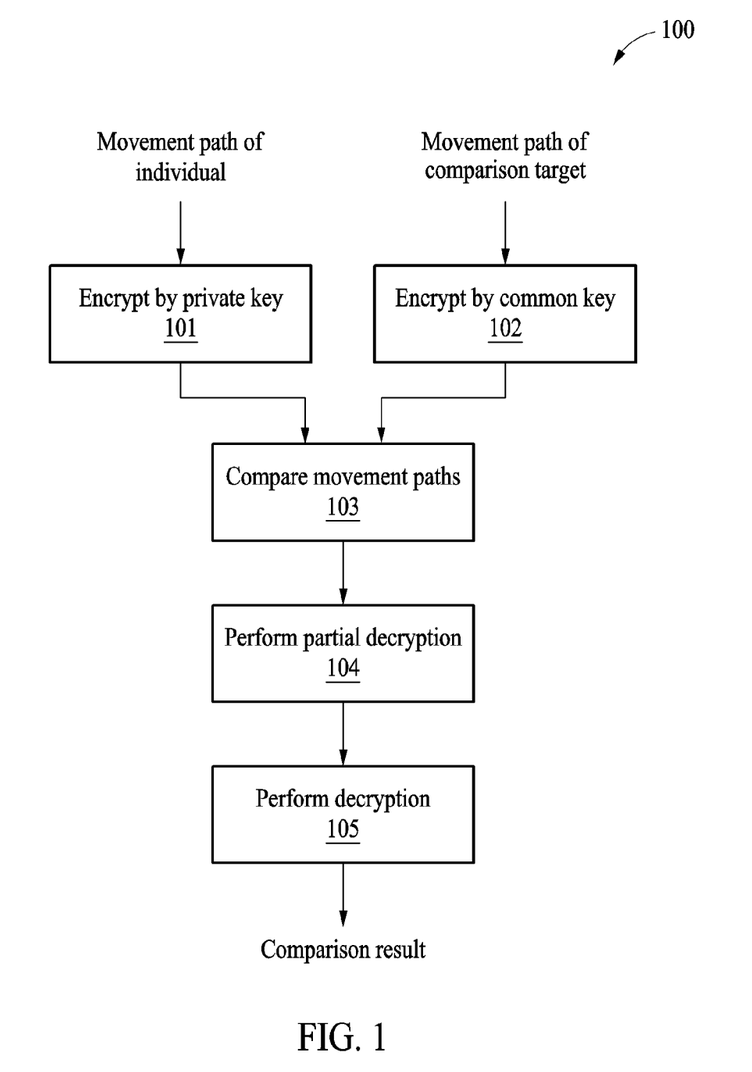
FIG. 1 illustrates an example of a homomorphic encryption-based movement path comparing method.

FIG. 1 illustrates an example of a homomorphic encryption-based movement path comparing method.

A homomorphic encryption-based movement path comparing method 100 (hereinafter simply a movement path comparing method 100) may encrypt movement paths of an individual in 101 and a comparison target in 102 (e.g., a person who is confirmed to be infected with an infectious disease). In 103, movement path comparing method 100 may compare the encrypted movement paths. Since movement path information of the individual and the comparison target is encrypted, there may be no infringement on personal privacy of either the individual or the comparison target. The comparison target may also be referred to herein as a confirmed person or confirmed case.

Using the movement path comparing method 100, a movement path of an individual may be encrypted by a private key, and a movement path of a comparison target may be encrypted by a managed common key. The encrypted movement path information of each of the individual and the comparison target may be homomorphically encrypted information where movement path information associated with where and when each of the individual and comparison target visit is encrypted. The private key may be accessible only by the individual, and the common key may be managed by a trusted authority.

Using the movement path comparing method 100, it is possible to compare the respective movement paths of the individual and the comparison target that are included in the encrypted movement path information without decrypting the encrypted movement path information. For example, a result of comparing the encrypted movement paths (hereinafter simply a comparison result) may be obtained by determining whether there is matching movement path information in the encrypted movement path information of the individual and comparison target.

In 104, using the movement path comparing method 100, a portion of the comparison result may be decrypted by the common key. The decrypted portion of the comparison result (hereinafter a partially decrypted comparison result) may be sent to the individual. In 105, the individual may perform decryption and then verify a final comparison result by decrypting the partially decrypted comparison result using the private key.

Figure 2:
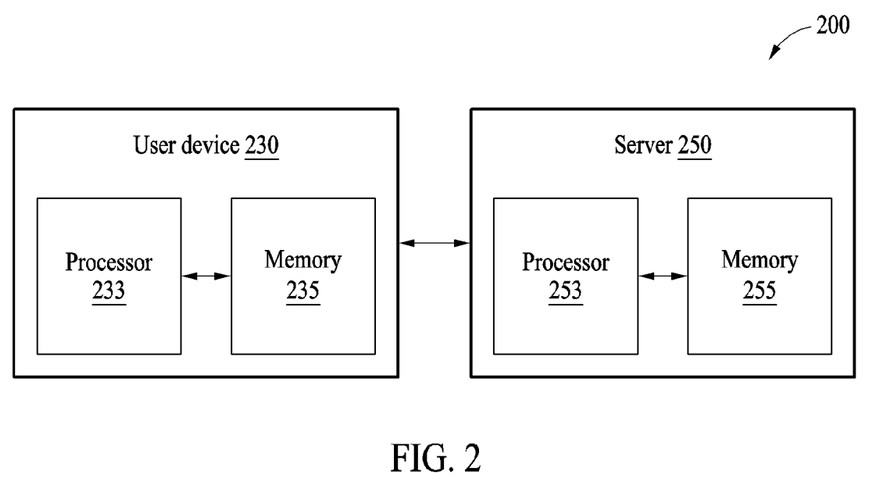
FIG. 2 illustrates an example of a homomorphic encryption-based movement path comparing system.

FIG. 2 illustrates an example of a homomorphic encryption-based movement path comparing system.

A homomorphic encryption-based movement path comparing apparatus 200 (hereinafter simply a movement path comparing apparatus 200) may perform the homomorphic encryption-based movement path comparing method 100 described above with reference to FIG. 1. Referring to FIG. 2, the movement path comparing apparatus 200 may include a user device 230 and a server 250.

The user device 230 may be an electronic device such as a computer, a smartphone, a tablet personal computer (PC), a smart device, a smart wearable device, and the like. The user device 230 may include a processor 233 and a memory 235.

The server 250 may be a cloud server configured to communicate with the user device 230. The server 250 may include a processor 253 and a memory 255.

The memory, for example, the memory 235 and the memory 255, may store instructions (or a program) executable by the processor, for example, the processor 233 and the processor 253. For example, the instructions may include instructions for executing an operation of the processor and/or instructions for performing an operation of each component of the processor. The memory may be implemented in a volatile or non-volatile memory device.

The volatile memory device may be implemented as a dynamic random-access memory (DRAM), a static RAM (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque-MRAM (STT-MRAM), a conductive bridging RAM (CBRAM), a ferroelectric RAM (FeRAM), a phase change RAM (PRAM), a resistive RAM (RRAM), a nanotube RRAM, a polymer RAM (PoRAM), a nano-floating gate memory (NFGM), a holographic memory, a molecular electronic memory device, or an insulator resistance change memory. Further description of the memory 235 and 255 is given below.

The processor 253 may process data stored in the memory. The processor may execute a computer-readable code (e.g., software) stored in the memory or instructions induced by the processor.

The processor 253 may be a hardware-implemented data processing device having a physically structured circuit for executing desired operations. For example, the desired operations may include instructions or a code in a program.

For example, the hardware-implemented data processing device may include for example, a microprocessor, single processor, independent processors, parallel processors, a central processing unit (CPU), a single-instruction single-data (SISD) multiprocessing, a single-instruction multiple-data (SIMD) multiprocessing, a multiple-instruction single-data (MISD) multiprocessing, a multiple-instruction multiple-data (MIMD) multiprocessing, a controller and an arithmetic logic unit (ALU), a DSP, a microcomputer, a processor core, a multi-core processor, and a multiprocessor, a programmable logic unit (PLU), a graphics processing unit (GPU), a neural processing unit (NPU), a multi-core processor, a multiprocessor, an application-specific integrated circuit (ASIC), and a field-programmable gate array (FPGA), or any other device capable of responding to and executing instructions in a defined manner. Further description of the processor 233 and 253 is given below.

Figure 3:
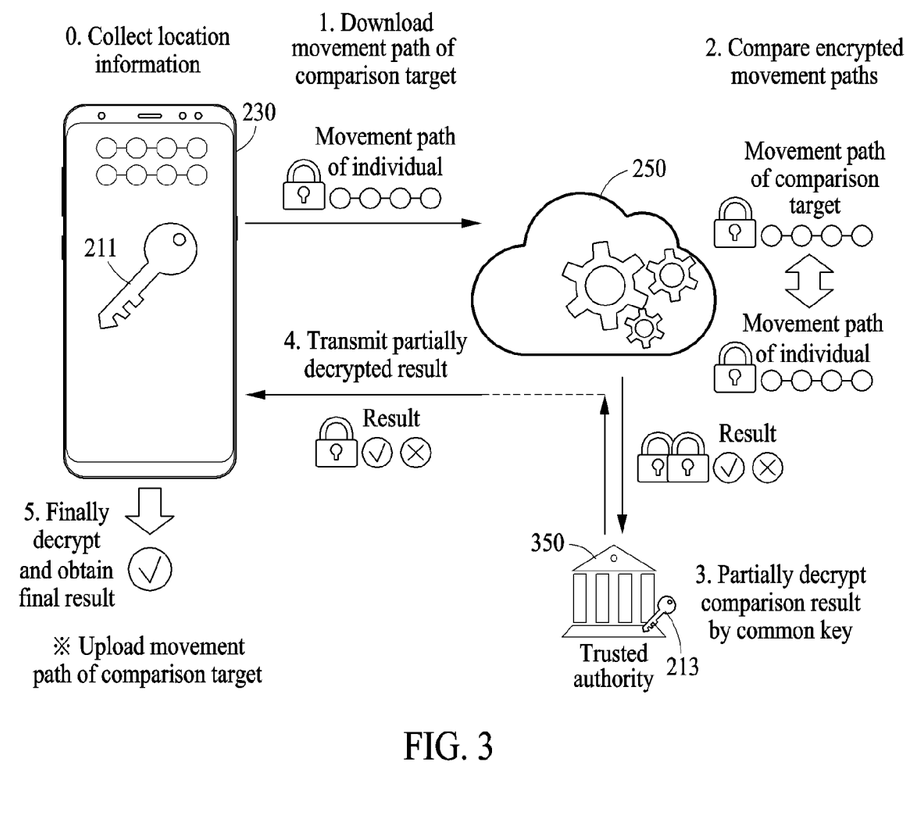
FIG. 3 illustrates an example of an operation of the movement path comparing system illustrated in FIG. 2.

FIG. 3 illustrates an example of an operation of the movement path comparing apparatus 200 illustrated in FIG. 2.

The server 250 may collect encrypted movement path information of a comparison target (e.g., a confirmed person). The encrypted movement path information of the comparison target may refer to movement path information encrypted by a common key 213. The server 250 may store the collected encrypted movement path information of the comparison target.

The user device 230 may obtain a movement path of a user by collecting location information of the user. The user device 230 may transmit, to the server 250, movement path information of the user that is encrypted based on a private key 211. The encrypted movement path information of the user may be obtained by the private key 211 that is accessible only by the user, and thus may not be decrypted by others.

The server 250 may compare the received encrypted movement path information of the user and the stored encrypted movement path information of the comparison target. The server 250 may compare the encrypted movement path information without decrypting the encrypted movement path information of the user and the comparison target, and generate a comparison result obtained by comparing the encrypted movement path information. The comparison result may include a result of whether there is a movement path on which the user and the comparison target have been in contact.

The server 250 may obtain a partially decrypted comparison result by decrypting a portion of the comparison result using the common key 213. The common key 213 may be managed by a trusted authority 350, and such an operation of decrypting the portion of the comparison result may be performed also by an external device (e.g., a device of the trusted authority 350) instead of the server 250.

The server 250 may transmit the partially decrypted comparison result to the user device 230. The user device 230 may then generate a final comparison result by decrypting the partially decrypted comparison result using the private key 211. The user may verify whether he/she has been in contact with the comparison target based on the final comparison result.

Figure 4:
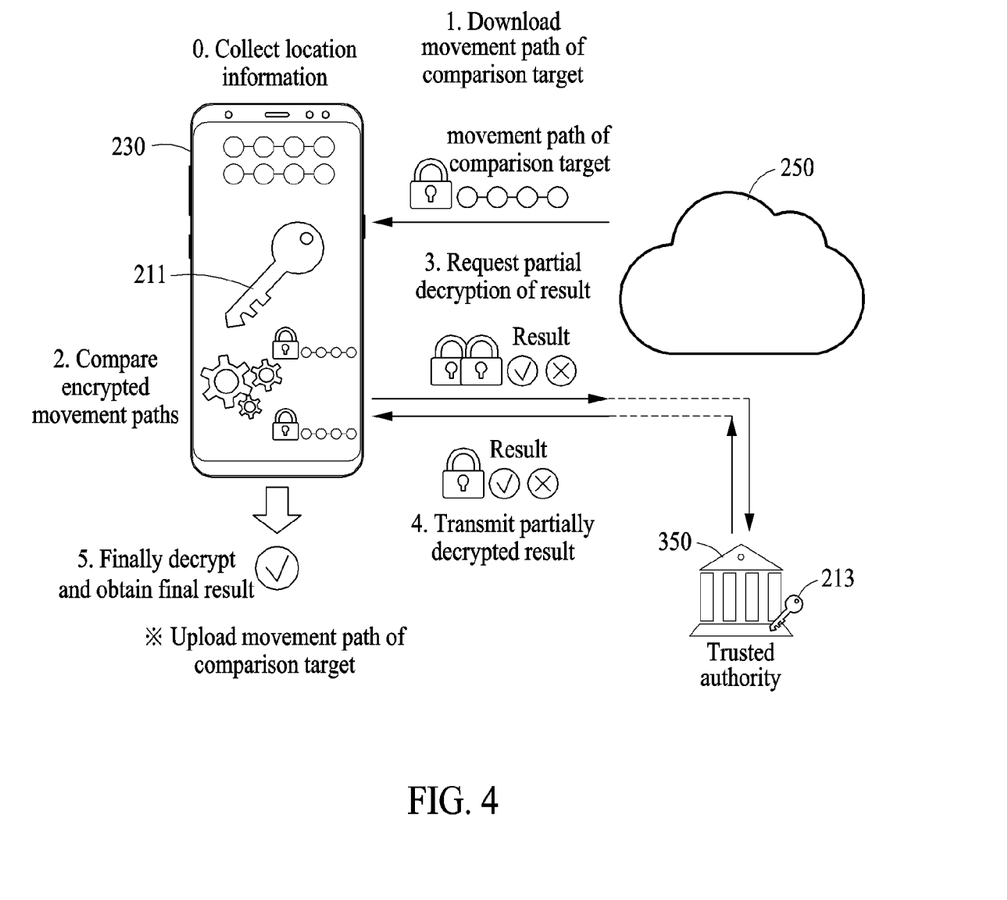
FIG. 4 illustrates another example of an operation of the movement path comparing system illustrated in FIG. 2.

FIG. 4 illustrates another example of an operation of the movement path comparing apparatus 200 illustrated in FIG. 2.

In contrast to the operation described above with reference to FIG. 3, the movement path comparing apparatus 200 may perform an operation of comparing movement paths through the user device 230.

The server 250 may collect movement path information of a comparison target (e.g., a confirmed person) that is encrypted by the common key 213. The server 250 may store the collected encrypted movement path information of the comparison target.

The user device 230 may obtain a movement path of a user by collecting location information of the user. The user device 230 may generate encrypted movement path information of the user, which is movement path information encrypted by a private key 211 that is only accessible by the user.

The user device 230 may receive, from the server 250, the encrypted movement path information of the comparison target. The encrypted movement path information of the comparison target may be obtained by the common key 213 that is inaccessible to an individual, and thus may not be decrypted in the user device 230.

The user device 230 may compare the encrypted movement path information of the user and the encrypted movement path information of the comparison target received from the server 250. In an example, the user device 230 may compare the encrypted movement path information without decrypting the encrypted movement path information of the user and the comparison target, and generate a comparison result of comparing the encrypted movement path information. The comparison result may include a result of whether there is a movement path on which the user and the comparison target have been in contact.

The user device 230 may transmit the comparison result to the server 250 to request partial decryption. The server 250 may obtain a partially decrypted comparison result by decrypting a portion of the comparison result by the common key 213. The common key 213 may be managed by the trusted authority 350, and such an operation of partially decrypting the comparison result may be performed also by an external device (e.g., device of the trusted authority 350) instead of the server 250.

The server 250 may transmit the partially decrypted comparison result to the user device 230. The user device 230 may then generate a final comparison result by decrypting the partially decrypted comparison result using the private key 211. The user may verify whether he/she has been in contact with the comparison target based on the final comparison result.

Figure 5:
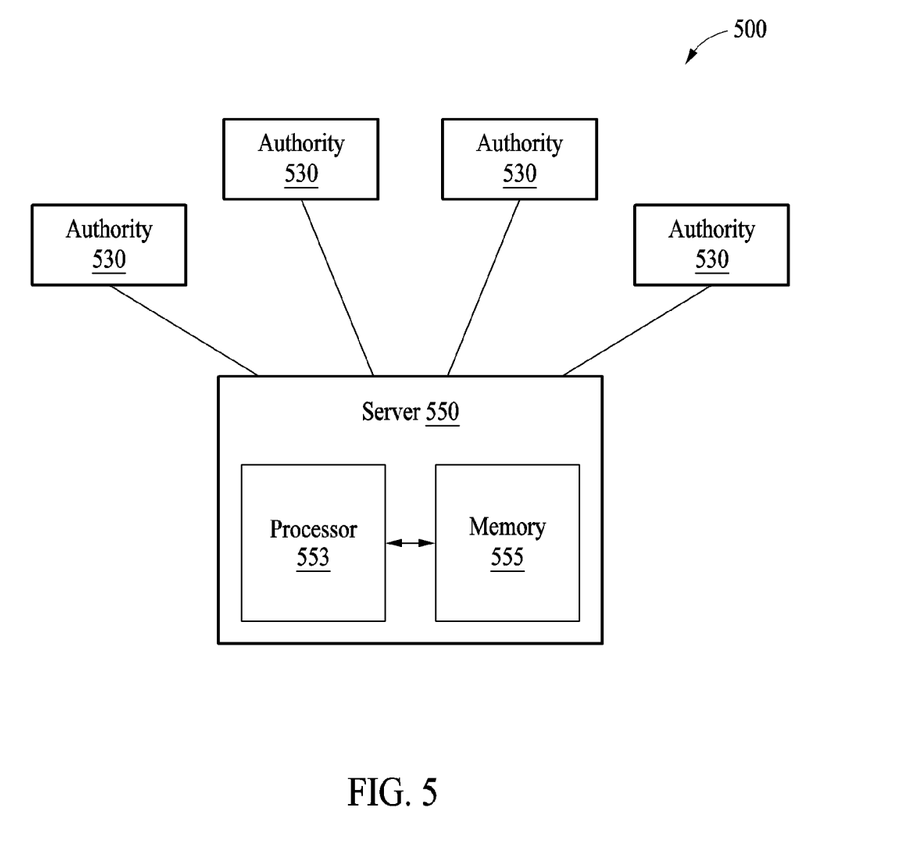
FIG. 5 illustrates another example of a homomorphic encryption-based movement path comparing system.

FIG. 5 illustrates an example of a homomorphic encryption-based movement path comparing apparatus.

A homomorphic encryption-based movement path comparing apparatus 500 may perform the movement path comparing method 100 described above with reference to FIG. 1. The movement path comparing apparatus 200 may include a server 550, and authorities 530 (e.g., communications or payment business operators) that collect movement paths of individuals. The server 550 may receive encrypted movement path information of the individuals from the authority 530, trace a movement path of a comparison target, and identify an individual who has been in contact with the comparison target.

The server 550 may be a cloud server configured to communicate with the authorities 530. The server 550 may include a processor 553 and a memory 555.

The memory 555 may store instructions (or a program) executable by the processor 553. For example, the instructions may include instructions for executing an operation of the processor 553 and/or instructions for performing an operation of each component of the processor 553. The memory 555 may be implemented in a volatile or non-volatile memory device.

The volatile memory device may be implemented as a DRAM, an SRAM, a T-RAM, a Z-RAM, or a TTRAM.

The non-volatile memory device may be implemented as an EEPROM, a flash memory, a MRAM, a STT-MRAM, a CBRAM, a FeRAM, a PRAM, a RRAM, a nanotube RRAM, a PoRAM, an NFGM, a holographic memory, a molecular electronic memory device, or an insulator resistance change memory. Further description of the memory 555 is given below.

The processor 553 may process data stored in the memory 555. The processor 553 may execute a computer-readable code (e.g., software) stored in the memory 555 or instructions induced by the processor 553.

The processor 553 may be a hardware-implemented data processing device having a physically structured circuit for executing desired operations. For example, the desired operations may include instructions or a code in a program.

For example, the hardware-implemented data processing device may include for example, a microprocessor, single processor, independent processors, parallel processors, a CPU, a SISD multiprocessing, a SIMD multiprocessing, a MISD multiprocessing, a MIMD multiprocessing, an ALU, a DSP, a microcomputer, a processor core, a multi-core processor, and a multiprocessor, a PLU, a GPU, a NPU, a multi-core processor, a multiprocessor, an ASIC, and an FPGA, or any other device capable of responding to and executing instructions in a defined manner. Further description of the processor 553 is given below.

Figure 6A:
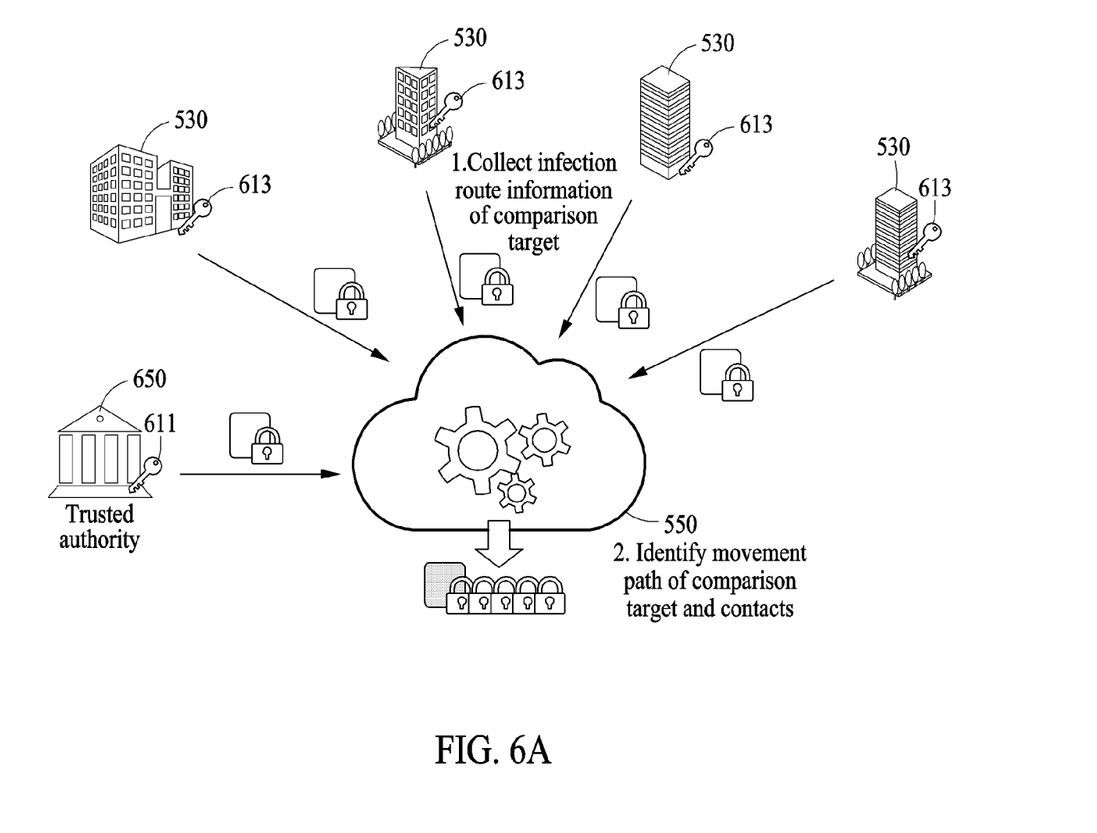
FIGS. 6A and 6B illustrate examples of an operation of the movement path comparing system illustrated in FIG. 5.
Figure 6B:
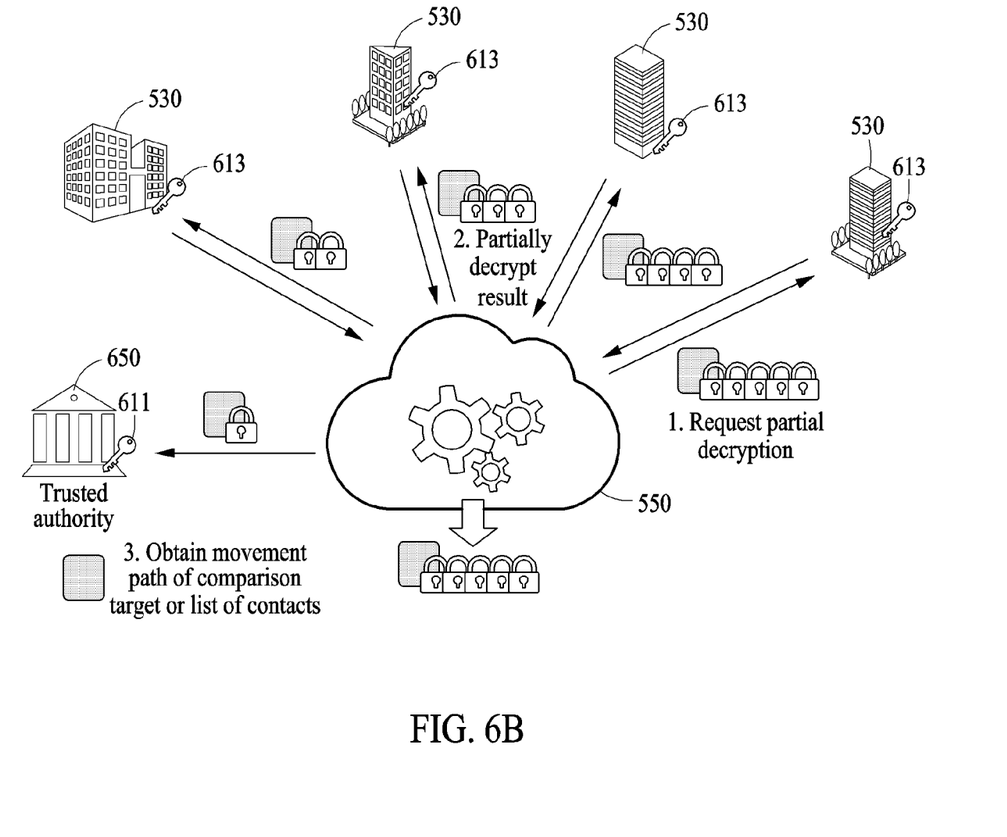

FIGS. 6A and 6B illustrate examples of an operation of the movement path comparing apparatus 500 illustrated in FIG. 5.

The server 550 may receive, from the authorities 530, movement path information of individuals including a comparison target that is the movement path information encrypted by a private key 613. The private key 613 may be a key managed by each of the authorities 530 to be accessible only by itself, and the encrypted movement path information may be homomorphically encrypted information.

The server 550 may generate a first encrypted contact list based on the encrypted movement path information received from the authorities 530. The server 550 may analyze the encrypted movement path information in an encrypted state, identify an individual who has been in contact with the comparison target, and generate the first encrypted contact list.

The server 550 may obtain a second encrypted contact list in which the first encrypted contact list is encrypted by a common key 611. The common key 611 may be managed by a trusted authority 650, and an operation of decrypting a portion of a comparison result of comparing the encrypted movement path information may be performed by an external device (e.g., a device of the trusted authority 650) instead of the server 550.

The server 550 may transmit the second encrypted contact list to the authorities 530. For example, the server 550 may transmit the second encrypted contact list to an authority 530. The server may receive, from the authority 530, a partially decrypted contact list obtained by decrypting a portion of the second encrypted contact list using a private key 613 of the authority 530. In an example, the server 550 may transmit the partially decrypted contact list to another authority 530 to allow the other authority 530 to partially decrypt the list by a private key 613 of the other authority 530, and then receive a second partially decrypted contact list from the other authority 530. In an example, the server 550 may allow the authorities 530 to partially decrypt the encrypted contact list in sequential order, and may obtain the partially decrypted contact lists that are decrypted by the private keys 613 of the authorities 530.

The server 550 may finally decrypt the partially decrypted contact lists that are decrypted by the private keys 613 of all the authorities 530, using the common key 611, thereby identifying a movement path of the comparison target and/or individuals who have been in contact with the comparison target.

The movement path comparing apparatus, homomorphic encryption-based movement path comparing apparatus 200, homomorphic encryption-based movement path comparing apparatus 500, and other apparatuses, devices, units, modules, and components described herein with respect to FIGS. 2 and 5 are implemented by hardware components.

Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods illustrated in FIGS. 1-6B that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the movement path comparing method. In another example, the instructions or software include higher-level code that is executed by the processor or computer using an interpreter. The instructions or software may be written using any programming language based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (Fe RAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A server, comprising:
   a hardware-implemented processor configured to:
      collect first encrypted movement path information of a comparison target encrypted by a common key;
      receive, from a user device, second encrypted movement path information of a user of the user device encrypted by a private key;
      compare the first encrypted movement path information and the second encrypted movement path information;
      decrypt a portion of a result of the comparison by the common key to generate a partially decrypted comparison result; and
      provide the partially decrypted comparison result to the user device.

2. The server of claim 1, wherein the first encrypted movement path information and the second encrypted movement path information comprise encrypted information associated with locations visited and time of the comparison target and the user, respectively.

3. The server of claim 1, wherein the first encrypted movement path information and the second encrypted movement path information comprise homomorphically encrypted information.

4. The server of claim 1, wherein the hardware-implemented processor is further configured to:
   verify whether movement path information included in the second encrypted movement path information matches any movement path information included in the first encrypted movement path information.

5. The server of claim 1, wherein the hardware-implemented processor is further configured to:
   enable the user device to decrypt the partially decrypted comparison result by the private key to verify whether to be a presence of a contact of the user with the comparison target.

6. The server of claim 1, wherein the private key is only accessible to the user and the user device.

7. The server of claim 1, wherein the partially decrypted comparison result is decrypted by an electronic device, being hardware-implemented, configured to manage the common key.

8. The server of claim 7, wherein the server is deployed in a cloud and is configured to communicate with the user device and the electronic device.

9. An electronic device, comprising:
   a hardware-implemented processor configured to:
      receive, from a server, first encrypted movement path information of a comparison target encrypted by a common key;
      compare the first encrypted movement path information and a second encrypted movement path information of a user encrypted by a private key;
      transmit a result of the comparison to the server; and
      receive, from the server, a partially decrypted comparison result comprising a portion of the comparison result decrypted by the common key.

10. The electronic device of claim 9, wherein the first encrypted movement path information and the second encrypted movement path information comprise encrypted information associated with locations visited and time of the comparison target and the user, respectively.

11. The electronic device of claim 9, wherein the first encrypted movement path information and the second encrypted movement path information comprise homomorphically encrypted information.

12. The electronic device of claim 9, wherein the hardware-implemented processor is further configured to:
   verify whether movement path information included in the second encrypted movement path information matches any set of movement path information included in the first encrypted movement path information.

13. The electronic device of claim 9, wherein the partially decrypted comparison result is decrypted by a second device, being hardware-implemented, configured to manage the common key.

14. The electronic device of claim 9, wherein the hardware-implemented processor is further configured to:
   decrypt the partially decrypted comparison result by the private key and verify whether there is a contact of the user with the comparison target.

15. The electronic device of claim 14, wherein the processor is further configured to:
   obtain validation from the user a result of verifying whether the user contacted the comparison target.

16. A server, comprising:
   a hardware-implemented processor configured to
   receive encrypted movement path information of individuals collected by one or more authorities and encrypted by one or more private keys corresponding to each of the one or more authorities;
   generate a first encrypted contact list based on the encrypted movement path information;
   transmit, to the one or more authorities, a second encrypted contact list in which the first encrypted contact list is encrypted by a common key;
   receive a partially decrypted contact list in which the second encrypted contact list is sequentially decrypted by the one or more private keys of the one or more authorities; and
   obtain a final contact list by decrypting the partially decrypted contact list by the common key.

17. The server of claim 16, wherein the encrypted movement path information comprises homomorphically encrypted information.

18. The server of claim 16, wherein the encrypted movement path information comprises encrypted information associated with locations and time of individuals who visit the one or more authorities.

19. The server of claim 16, wherein the first encrypted contact list is generated by searching for contacts having a matching movement path with that of a comparison target based on the encrypted movement path information.

20. The server of claim 16, wherein the partially decrypted contact list is decrypted by an electronic device, being hardware-implemented, configured to manage the common key.

* * * * *